(12) United States Patent  
Dubois

(10) Patent No.: US 7,021,207 B2  
(45) Date of Patent: Apr. 4, 2006

(54) RECTANGULAR BALING PRESS

(75) Inventor: Jean-Yves Dubois, Gresancey (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/839,050

(22) Filed: May 5, 2004

(65) Prior Publication Data

US 2004/0221747 A1 Nov. 11, 2004

(30) Foreign Application Priority Data

May 6, 2003 (DE) .................. 103 19 985

(51) Int. Cl.
*B65B 57/10* (2006.01)
*B30B 9/30* (2006.01)

(52) U.S. Cl. ................ 100/4; 100/6; 100/8; 56/10.2 R; 56/341

(58) Field of Classification Search ............ 100/4, 100/6, 43, 49, 96, 97, 99; 56/10.2 A, 10.2 R, 56/341, 344, 432, 433, 451, DIG. 15
See application file for complete search history.

(56) References Cited

U.S. PATENT DOCUMENTS 4,955,188 A * 9/1990 von Allworden ............ 56/341

6,394,893 B1 5/2002 Scholz et al.

FOREIGN PATENT DOCUMENTS

| DE | 198 41 598 | 3/2000 |
|----|------------|--------|
| EP | 0 341 508 | 11/1989 |
| EP | 0 341 508 B1 | 8/1992 |
| EP | 1 133 914 | 9/2001 |
| EP | 1 133 914 A2 | 9/2001 |
| FR | 2 742 305 | 6/1997 |
| WO | WO 01/56363 | 8/2001 |

* cited by examiner

*Primary Examiner*—Derris H. Banks
*Assistant Examiner*—Jimmy Nguyen

(57) ABSTRACT

Cutting devices are known in rectangular baling presses that can be taken out of operation so that cut or uncut harvested material is selectively pressed. However, this is disadvantageous since it is difficult to hold cut harvested material together with binder twine under high tension. A rectangular baling press is proposed in which the cutting device is taken out of operation at least at the start and end of bale formation so that the twine presses only against uncut material at the end of the bale. The cutting device may additionally be taken in and out of operation during formation of the bale so that upper and lower layers of the bale are also formed by uncut material.

4 Claims, 1 Drawing Sheet

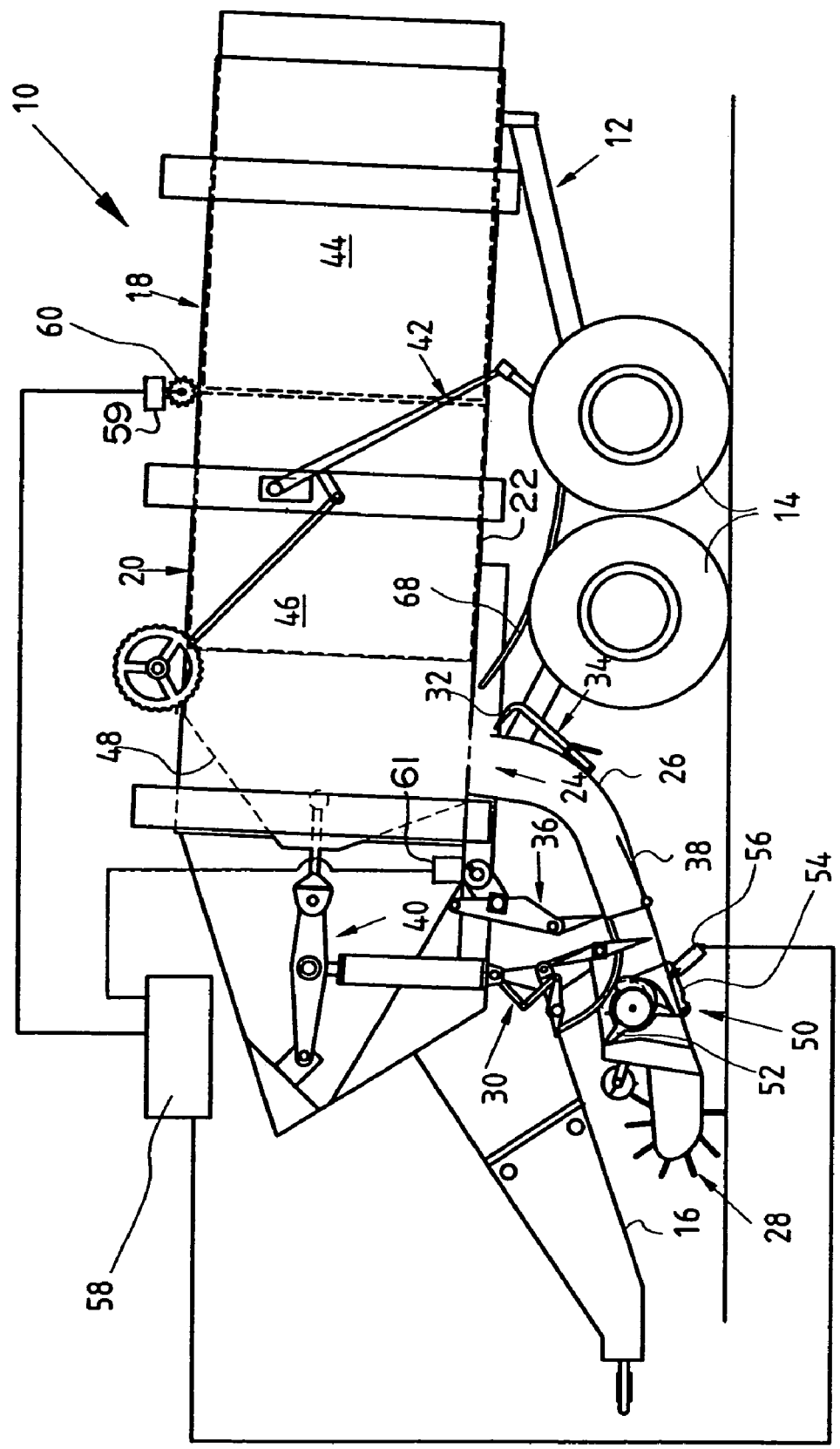

7,021,207 B2

RECTANGULAR BALING PRESS

FIELD OF THE INVENTION

The invention concerns a rectangular baling press with a pressing area, a supply channel, a binding device and a cutting device upstream of the pressing area.

BACKGROUND OF THE INVENTION

EP A2 11 33 914 discloses a rectangular baling press with a cutting device that can be taken out of operation so that cut or uncut harvested material can be selectively pressed.

According to EP B1 341 508 the cutting device of a heavy-duty baling press is disabled at the end of the formation of a round bale in order that premature separation of the round bale does not occur after it leaves the pressing chamber.

SUMMARY OF THE INVENTION

The invention is based on the problem that bales of cut harvested material are difficult to hold together with binder twine Under high tension.

The invention solves this problem by providing a control so that the cutting device is entirely or partially disabled at the start and at the end of the formation of a bale.

In this manner, the formed bale does consist substantially of cut harvested material but the binder twine rests on uncut sections so that the bale does not break apart under the high tension forces of the twine.

There are various possibilities of forming a rectangular bale. Usually, several packets are pre-compressed and inserted as a stack into the pressing area. It is basically sufficient in this case if the first and last packet in a bale consist of uncut material. In other cases, material to be pressed is introduced continuously into the pressing area, e.g., when feeding takes place axially with a worm. In this case, the thickness of the uncut beginning and ending sections is proportional to the feed time of the material so that the cutting device is taken out of operation for a certain time, which corresponds to a certain thickness of the section of uncut material.

Since the pressing operation is controlled or regulated on the basis of various constantly monitored parameters of the rectangular baling press, it is logical to also use these parameters, which are furthermore used for a synchronous flow of the movements of the pressing components, binding components and supply components, for the control or regulation of the cutting device. The activation and deactivation of the cutting device can accordingly take place either mechanically via a linkage or the like, or electrically by means of sensors, switches or the like. An optimization is achieved in particular in the case of a rectangular baling press without heap-like feeding of material by taking several parameters into consideration, e.g., a measuring wheel that determines the beginning of a bale and applied pressure that determines the approaching end of a bale.

It is also conceivable, depending on the desired or acceptable proportion between cut and uncut harvested material, to collect uncut harvested material not only on the front surfaces of the bale but also on its top and its bottom. In this manner no harvested material is lost during the further handling of the bale, e.g. during transport or during winding.

BRIEF DESCRIPTION OF THE DRAWINGS

The drawing shows an embodiment example of the invention described in detail below.

The sole FIGURE of the drawing shows a rectangular baling press in a schematic side view.

DESCRIPTION OF THE PREFERRED EMBODIMENT

The drawing shows a rectangular baling press 10, for producing rectangular bales, that comprises a frame 12 supported on ground by a tandem arrangement of support wheels 14. A draft tongue 16 is connected to the frame 12 and extends from the latter to the front and is designed in such a way that it can be connected to a towing vehicle such as a tractor, which is provided with a power take-off shaft for supplying power to drive various driven components of the rectangular baling press 10. Pressing area 18 or a chamber with a rectangular cross section is partially formed by an upper housing part 20 and a lower housing part 22. The lower housing part 22 is provided with material inlet 24, to which a curved supply channel 26 is connected, which functions as a pre-pressing area as described in the following. A receiving device 28 includes a pick-up and a center-feed auger arranged upstream of the supply channel 26 in order to lift a swath of harvested material from the ground and deliver it to a compressing fork 30 that serves to compress harvested material into the supply channel 26 until a load with a determined density has collected upstream of fingers 32 of a retention device 34. The retention device 34 is pivotably mounted to move between a retaining position, in which fingers 32 extend into supply channel 26 in the vicinity of material inlet 24, and a supply position, in which the fingers 32 are retracted from the supply channel 26 in order to make it possible for the load of harvested material to be pushed through material inlet 24 into pressing area 18 by a loading fork assembly 36. A spring-loaded flap 38 is pivotably mounted in a lower front position of the supply channel 26 and pivots as a function of the pressure from the harvested material present in supply channel 26. Once the harvested material has reached the desired density, an electric control circuit (not shown) is supplied with current that produces appropriate drive connections that first causes retention device 34 to move in such a way that it retracts fingers 32 from the blocking position, as shown in the drawing, and then loading fork assembly 36 is activated in such a way that its forks 30 slide through supply channel 26 and move the load of harvested material into pressing area 18. Once the load of harvested material has been pushed into pressing area 18, a plunger mechanism 40 arranged in a forward location of the frame 12 is actuated in a controlled sequence according to the loading fork assembly 36 in order to move the harvested material to the rear into pressing area 18, by way of a pressing plunger 48, where it is compressed into a bale 46, as is well known from the prior art. After the started bale 46 has reached a pre-selected length, a binding device 42, that supplies binder twine and comprises several curved needles 68, is activated in order to supply several strands of twine to an appropriate number of tying devices (not shown) that function in such a way that they place lengths of twine around the pre-selected length of the bale in order to form a bound bale 44 ready for unloading, which takes place when bale part 46 is pressed out of the rear part of pressing area 18 as new loads of harvested material are being pushed into pressing area 18.

Reference to the details of the plunger mechanism 40 shows that it comprises the pressing plunger 48 arranged for a back-and-forth motion in the pressing area 18 between a withdrawn position in front of material inlet 24 and an extended position above material inlet 24. This motion of the pressing plunger 48 causes loads of harvested material from the supply channel 26 to enter the pressing area 18 and be compressed against previously introduced harvested material, including partially formed bales 46 and/or complete bales 44.

A cutting device 50 is provided between the receiving device 28 and the compressing fork 30 in a known manner. In the present embodiment example, the cutting device 50 is designed in such a way that it transports in an undershot fashion, however, this is not obligatory. This cutting device 50 comprises a comb rotor 52 and knives 54 that can be brought, preferably together, into or out of engagement with comb rotor 52 by a positioning device 56.

Finally, a control device 58 is provided that is connected on the one hand for receiving input signals from a sensor 59 at a measuring wheel 60, and to a sensor 61 at the loading fork assembly 36, and on the other hand for delivering a control signal to the positioning device 56. The measuring wheel 60 is used for determining the length of a bale 46 being formed with the sensor 58 sensing the movement of the wheel 60. The sensor 59 senses the position of the loading fork assembly 36. Instead of, or in addition to, the measuring wheel 60 and loading fork assembly 36, the control device 58 could also be connected to (not-shown) sensors for determining the pressure of the plunger mechanism 40 and the position of flap 38, or to other sensors that could furnish information about the formation of the bale 46.

The following operation results from the foregoing.

It is assumed that the control device 58 is adjusted in such a way that the first and last sections of bales 44 and 46 should not consist of cut harvested material. In this case, the measuring wheel 60 or a sensor (not shown) arranged thereon supplies a signal to the control device 58, after which the formation of a new bale 46 begins. This signal is processed by the control device 58 and output to the positioning device 56, which retracts the knives 54 from the supply channel 26 to an inactive position so that the comb rotor 52 only advances but does not cut the received harvested material. As soon as this uncut harvested material is introduced into the pressing area 18 and is pressed by the pressing plunger 48 against the already formed bale 44, the measuring wheel 60 rotates, thereby indicating to the control device 58 that the end section is formed by uncut harvested material. The control device 58 then actuates the control device 56 so that the knives 54 move into the supply channel 26 and cut all received harvested material. The supplying of cut harvested material takes place until it is determined on the basis of the revolutions of the measuring wheel 60, or on the basis of another sensor, that the formation of bale 46 is reaching its final phase. When it does, the control device 58 again supplies the signal to the positioning device 56 to remove the knives 54 from the supply channel 26 so that even the last section consists of uncut harvested material.

If it is desired to place uncut crop on the top and bottom of the bale 46 as well as on both ends of the bale 46, the signals from the sensors 59 and 61 are processed by the control device 58 in such a way that after the initial layer of uncut crop is formed at the beginning of the new bale 46, the positioning device 56 is caused to keep the knives 54 in their inactive position so that uncut crop will initially be conveyed into the supply channel 26 which now has its upper end closed by the retaining device 34. After a short delay, the positioning device 56 will be actuated to move the knives 54 into their operating position for cutting the crop. This will continue until just before the crop collected in the supply channel reaches the predetermined density for effecting operation of the loading fork assembly 36, as determined by the flap 38. A signal generated by a sensor there (not shown) will then cause the control device 58 to actuate the positioning device 56 for withdrawing the knives 54. This will result in uncut crop being loaded into a lower part of the channel 26 below a layer of uncut crop. When the predetermined density is reached, the retaining device 34 will retract and the loading fork assembly 36 will sweep the charge of crop into the pressing area 18, with the process repeating until the control device 58 receives a signal from the sensor 59 indicating that the bale 46 is almost finished. The control device 58 will then cause the positioning device 56 to withdraw the knives 54 to their inactive position so that the forward end of the bale 46 is supplied with uncut crop. Then the entire procedure is repeated during the formation of the next bale.

Alternatively to the embodiment example presented, the cutting device 50 can also be designed in such a way that not all of the knives 54 but only a few of them are removed from the supply channel 26.

Having described the preferred embodiment, it will become apparent that various modifications can be made without departing from the scope of the invention as defined in the accompanying claims.

The invention claimed is:

1. In a rectangular baling press including a pressing area, a supply channel leading to an inlet of the pressing area, a binding device, a crop receiving device located upstream from said supply channel and a cutting device located between said receiving device and said supply channel and including a plurality of knives mounted for movement between a cutting position, wherein the knives are positioned so as to be in a stream of crop delivered towards the supply channel by the receiving device, and an inactive position, wherein the knives are withdrawn so as to be free of the stream of crop, and a positioning device coupled to said knives and being responsive to a control device for selectively moving the knives between said cutting and inactive positions, the improvement comprising: a sensing device for determining that a condition exists for starting formation of a new bale in said pressing area and for sending a signal to said control device for causing the latter to operate said positioning device so as to move said knives to said inactive position for a first period of time, to then move said knives back to said cutting position, for a second period of time which ends before the formation of the new bale is ended, and then to again move said knives to said inactive position until the bale is finished.

2. The rectangular baling press, as defined in claim 1, wherein said sensing device and control device cooperate such that said first and second periods of time are adjustable.

3. The rectangular baling press, as defined in claim 1 wherein said baling press includes a bale length measuring wheel mounted for being contacted by a forming bale and a loading fork assembly having forks mounted for selectively sweeping through said supply channel for causing crop located there to be moved into said press area; and said sensing device sending input signals to said control device in response to operation of at least one of said measuring wheel and loading fork assembly.

4. The rectangular baling press, as defined in claim 1, wherein said control device processes input signals from said sensing device so as to control said positioning device for manipulating said cutting knives such that uncut crop is delivered to said pressing area so as to be located at upper and lower layers of the bale on opposite sides of cut crop, except at opposite ends of the bale which are formed by uncut crop.

* * * * *